United States Patent [19]

Spevack

[11] Patent Number: 4,489,561
[45] Date of Patent: Dec. 25, 1984

[54] SYSTEM FOR PRODUCING STEAM AND MECHANICAL ENERGY FROM A HYDROTHERMAL FLOW

[76] Inventor: Jerome S. Spevack, 160 W. Pinebrook Dr., New Rochelle, N.Y. 10804

[21] Appl. No.: 428,651

[22] Filed: Sep. 30, 1982

[51] Int. Cl.³ .............................................. F03G 7/04
[52] U.S. Cl. ................. 60/641.5; 60/641.2; 165/45
[58] Field of Search ................. 60/641.2, 641.4, 641.5, 60/642; 165/45

[56] References Cited

U.S. PATENT DOCUMENTS

| | | | |
|---|---|---|---|
| 4,132,075 | 1/1979 | Fleck et al. | 60/641.5 |
| 4,138,851 | 2/1979 | Rogers et al. | 60/641.5 |
| 4,364,232 | 12/1982 | Sheinbaum | 60/641.2 |

Primary Examiner—Stephen F. Husar

[57] ABSTRACT

A two-phase hydrothermal flow, e.g. from a geothermal source, is separated and provides steam at a desired pressure for production of power both from the steam phase and from thermal energy contained in the hot water phase. The separated hot water phase is processed in a heat conversion system which extracts sensible heat and produces from a portion thereof auxiliary steam at least at the vapor pressure of the hot water, and this auxiliary steam may be utilized either separately or together with said separated steam phase in a prime mover and condenser system for production of power. Where a geothermal hydrothermal flow contains noxious noncondensable gases which contaminate the steam phase, after condensation of the steam such gases may be withdrawn from the condenser and dissolved in the cooled hot water phase and reinjected underground to avoid environmental pollution.

20 Claims, 2 Drawing Figures

SYSTEM FOR PRODUCING STEAM AND MECHANICAL ENERGY FROM A HYDROTHERMAL FLOW

BACKGROUND OF THE INVENTION

1. Field of the Invention

This invention relates to processes and apparatus for producing steam from a hydrothermal flow and for utilizing such steam. It further relates to the production of mechanical energy from such steam and from the thermal energy contained in a two-phase hydrothermal flow, especially with respect to two-phase flows of steam and water which occur in industrial processes and those which occur below and/or above the earth's surface in the operation of wells drawing from subterranean water dominated geothermal resources. It also relates to the control of environmental pollution in the utilization of hydrothermal flows containing gaseous contaminants.

2. Description of the Prior Art

The utilization of thermal energy available in a flow of steam and water to produce mechanical power has been accomplished by separating the two phases and then passing the steam through a prime mover, e.g. a steam driven turbine. Thermal energy available in the form of sensible heat contained in hot liquid water has been converted into a steam which in turn has been used to produce mechanical energy by flashing at a reduced pressure or by transferring such energy in a boiler from the hot water to other water maintained at a temperature and pressure considerably lower than the temperature and vapor pressure of the hot water, and the low pressure steams so generated have been utilized to drive a relatively poor efficiency prime mover capable of operating at such low pressure. Also, sensible heat energy contained in hot water has been converted into mechanical energy by use of the so called binary system by which sensible heat is employed to boil a fluid other than water which has a lower boiling point than water, e.g. an organic fluid, and the vaporized fluid generated at a relatively high pressure thereby is circulated through a separate turbine and condenser in a closed loop. These practices with respect to two-phase hydrothermal flows have either utilized thermal energy only from the steam phase or have required the use of special combinations of high and low pressure steam driven prime movers or special aggregations of separate power producing systems, e.g. one based on conventional steam utilization and another employing the binary system, all at considerable additional capital cost and operating expense per unit of mechanical power produced.

The utilization of the thermal energy available in two-phase hydrothermal fluids from geothermal resources has generally been subjected to environmental and economic problems associated with the gases which contaminate the steam separated from the two-phase flow. Such gases result from flashing at the lower than subterranean pressures which the fluids experience in rising to the earth's surface and in being prepared for utilization. Some of these gases, e.g. hydrogen sulfide, are pollutants to the environment and often special facilities directed to control the emission of one or more specific contaminants are required. Other substances present in the steam, e.g. boric acid and silica, deposit scaling materials in the power production equipment and are responsible for costly periodic maintanance practices.

SUMMARY OF THE INVENTION

The principle purpose of the present invention is to depart from the energy wasting and costly practices of the prior art and instead to advantageously utilize the thermal energy available in hot liquid flows and in particular the thermal energy available in two-phase hydrothermal flows. This is accomplished by converting sensible heat of the hot liquid into steam at a pressure which is at least approximately the vapor pressure of water at the temperature of the hot liquid. Where a two-phase hydrothermal flow is involved, in addition to producing extra steam from sensible heat of the hot water phase, this invention makes it possible to separate the two phases and still employ a single pressure feed steam driven prime mover, e.g. one turbine and condenser, for utilization of the thermal energy available from both the steam and liquid water phases of said two-phase flow. The present invention performs the foregoing by employing in combination heat conversion means for extracting sensible heat from a hot liquid and converting a portion thereof into sensible and latent heat in the form of steam at a pressure at least approximately the vapor pressure of water at the temperature of said hot liquid, e.g. heat conversion means as described in my copending application Ser. No. 428,652 filed Sept. 30, 1982 concurrently herewith and incorporated herein by reference. As employed in the combinations of the present invention, said means has the capability of increasing the temperature level of one portion of the heat energy extracted from hot liquid water while reducing the temperature level of another portion thereof, the increased temperature level providing a heat source capable of boiling water at a temperature at least approximately that of the hot liquid. A circulating fluid in said heat conversion means transfers said one portion of heat energy at said increased temperature level to vaporize water in a boiler thereby producing steam. Another cooperating circulation of fluid in said heat conversion means transfers said other portion of heat energy to a coolant thereby producing said reduced temperature level and discharging this other portion of heat energy from the system.

Pollution of the environment by undesirable noncondensable gases which may be present in the steam from a geothermal resource can be avoided by redissolving such gases, remaining after condensation of the steam, in the cooled geothermal waters to be reinjected underground, the solubility of such gases increasing at lower temperature as well as at higher pressure.

A modification of the present invention advantageously controls the transfer of contaminating gases and scaling materials to the power production equipment as well as pollution of the environment from hazardous gaseous contaminants in the utilization of a two-phase hydrothermal flow from a geothermal resource. Here, in addition to the production of auxillary steam from sensible heat of the separated hot liquid phase as aforesaid, the separated raw steam phase is condensed and cooled and its thermal energy is transferred to produce uncontaminated clean steam which is delivered to the prime mover and then recycled. The contaminant gases from the raw steam are collected and mixed with and dissolved in the cooled condensate from the raw steam and the cooled raw liquid water phase which are to be reinjected underground.

Among the objects of the present invention, severally and interdependently, are:

1. To provide an improved system for producing mechanical power utilizing thermal energy contained in both the liquid water and steam phases of a two-phase hydrothermal flow;

2. To utilize thermal energy of a hot liquid flow in the form of steam at a pressure at least approximately the vapor pressure of water at the temperature of said hot liquid;

3. To convert thermal energy into mechanical energy with a steam driven prime mover supplied with a single flow of steam comprising raw steam separated from a two-phase hydrothermal flow and auxiliary steam produced from sensible heat of the separated liquid water phase thereof;

4. To separate steam from a two-phase hydrothermal flow and, utilizing sensible heat of the separated hot liquid water phase, to produce additional steam at a pressure at least approximately that of said separated steam;

5. To provide a self-contained or closed circulation which transfers to a prime mover thermal energy received from both the steam and liquid water phases of a two-phase hydrothermal flow;

6. To transfer thermal energy from both phases of a two-phase hydrothermal flow from a geothermal resource to a steam driven prime mover without transferring contaminants contained in said two-phase flow to the prime mover; and 7. To provide a system for utilizing thermal energy available from both phases of a two-phase hydrothermal flow from a geothermal resource while avoiding emission to the environment of gaseous contaminants, e.g. hydrogen sulfide, contained in said two-phase flow.

Further objects and advantages of the present invention will appear from the detailed description of preferred embodiments thereof hereinafter presented and as particularly pointed out in the appended claims, said preferred embodiments being illustrative and not restrictive of the scope of the invention disclosed and claimed herein.

BRIEF DESCRIPTION OF THE DRAWINGS

In the accompanying drawings, in which flow diagrams are set out illustrative of the invention.

DETAILED DESCRIPTION

Figure 1:
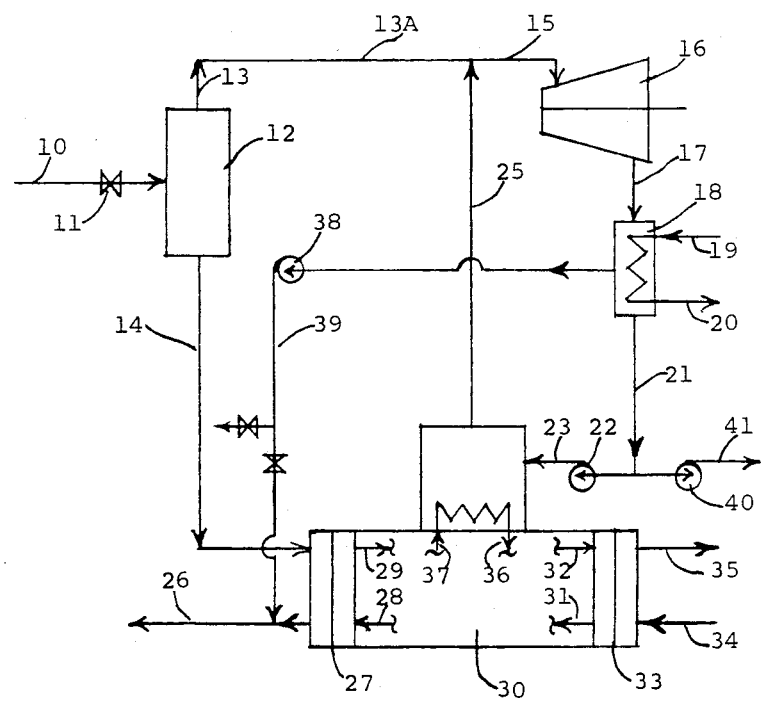
FIG. 1 is a flow diagram of a system according to a preferred embodiment of the invention for producing steam from sensible heat of the liquid water phase of a two-phase hydrothermal flow and for producing mechanical energy from thermal energy of both the steam and liquid water phases of said two-phase flow.
Figure 2:
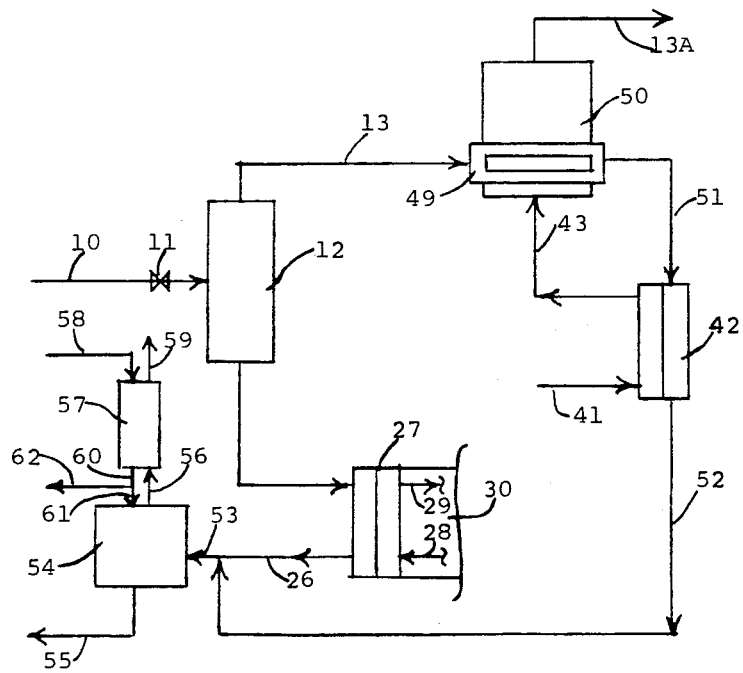
FIG. 2 is a flow diagram illustrating a modification of the system of FIG. 1 for improving the quality of the steam supply to the prime mover and condenser by eliminating transfer of gaseous contaminants thereto and for providing an improved means for disposal of such contaminants.

In the preferred embodiments of the invention illustrated in FIGS. 1 and 2, the system comprises process and apparatus for producing mechanical power from the thermal energy available in both phases of a two-phase steam and liquid water hydrothermal flow supplied via conduit 10 at a relatively hot temperature, e.g. at 320° F., through throttle or cut-off means shown as valve 11. The two-phase flow may be supplied from any suitable source, e.g. from a hydrothermal well in a water dominated geothermal resource (not shown), and delivered to separator 12 where it is separated into a raw steam flow and a raw liquid water flow. The raw steam flow passes through conduit 13-13A and via conduit 15, at a slightly reduced temperature due to line pressure losses, e.g. at 300° F., to a prime mover 16, illustrated as a turbine, and then via conduit 17 to a condenser 18, illustrated as a surface or indirect contact type heat exchanger, which is cooled, e.g. to 160° F., by a cooling medium, e.g. cooling water, supplied thereto from an external source via conduit 19 and discharged therefrom via conduit 20. Condensate formed in condenser 18 is withdrawn via conduit 21.

The raw liquid water phase from separator 12, e.g. at 300° F., is passed via conduit 14 through heat exchanger 27 of heat conversion means 30 where it transfers sensible heat via conduits 28 and 29 to one or more fluids circulating in the means 30 and is cooled, e.g. to 160° F., and is then passed via conduit 26 to disposal, e.g. to reinjection underground. The thermal energy thus accepted from the raw liquid water phase in 27 is processed in the means 30 for increasing the temperature level of one portion thereof in a circulation of heated fluid and for decreasing the temperature level of another portion thereof in a circulation of cooled fluid. Said circulation of heated fluid passing via conduits 36 and 37 in said means 30 provides a heat source at said increased temperature level to boiler 24 of said means 30 wherein said one portion of thermal energy is transferred from said heated fluid to the vaporizing of water, e.g. at 300° F., producing additional or auxiliary steam. Passing via conduits 31 and 32 in heat exchanger 33 of said means 30 said circulation of cooled fluid is cooled to said decreased temperature level by a coolant, shown as a flow of cooling water supplied from an external source via conduit 34, e.g. at 85° F., and discharged therefrom via conduit 35. The auxiliary steam produced in boiler 24 is passed via conduit 25 to the inlet of the prime mover 16, as by conduit 15 together with raw steam from separator 12. Condensate from conduit 21, pumped by pump 22 via conduit 23 provides the water which is vaporized in boiler 24. Residual noncondensable gases in condenser 18 may be removed by gas pump 38 and suitably disposed of via conduit 39, e.g. by solution in and disposal with the raw liquid water phase in conduit 26. If desired, condenser 18 may be of the direct contact type with cooling water supplied via 19 from a natural source or from a suitable cooling and/or water treatment system, e.g. cooling tower, and in such instance condensate mixed with the cooling water may be withdrawn via conduit 21 and divided for discharge by pump 40 via conduit 41 and for recirculation by pump 22 via conduit 23 to the auxiliary steam boiler 24.

The modification illustrated in FIG. 2 enables thermal energy of the raw steam from separator 12 to be transferred to turbine 16 and condenser 18 without transfer thereto of gaseous contaminants contained in such steam. This is accomplished by interposing in the conduit 13-13A an evaporator or boiler 50 which comprises a heat exchanger 49 wherein raw steam from separator 12 is condensed while the heat energy from such condensation is transferred to the vaporizing of relatively clean water supplied by condensate from conduit 41. In this embodiment, heat exchanger 42 is employed to recover sensible heat from the raw steam condensate in conduit 51 by transferring thermal energy from it to the clean water supplied to boiler 50 from conduit 41 via conduit 43. While in the illustrated embodiment the noncondensed gaseous contaminants remaining after condensation of the raw steam in heat exchanger 49 are passed together with the liquid condensate through conduit 51, if desired, they may be separated for other disposition.

The raw steam from separator 12 may contain such noncondensable gaseous contaminants as, for example, carbon dioxide, hydrogen sulfide, ammonia, boric acid, nitrogen, hydrogen, methane and other gases common to geothermal steams. Such contaminants effect the utility of the steam as an energy source and, in addition, the emission of certain of them, e.g. hydrogen sulfide, can cause pollution problems. In the system of FIG. 2, the gaseous contaminants are at least in part returned to a subterranean location dissolved in or mixed with the cooled raw liquid water phase from separator 12 and the cooled condensed raw steam from conduit 52. In the embodiment of FIG. 2, the combined liquid flows from conduits 26 and 52 are passed via conduit 53 to a gas separator 54 wherein undissolved gases may be withdrawn via conduit 56 before delivering the liquid via conduit 55 for reinjection underground. Such withdrawn gases may be chemically treated by known methods in absorber or reactor 57 to remove particular gaseous components before the gas is discharged via conduit 59 to the atmosphere. Absorption or reaction products of such treatment withdrawn via conduit 60 may, via conduit 61 be mixed with the liquids to be reinjected, or may be withdrawn via conduit 62 from the system.

While there have been described herein what are at present considered preferred embodiments of the invention, it will be obvious to those skilled in the art that modifications, including changes, omissions and substitutions, may be made without departing from the essence and principle of the invention. It is therefore to be understood that the exemplary embodiments are illustrative and not restrictive of the invention, the scope of which is defined by the disclosure and the appended claims herein, and that all modifications that come within the meaning and range of equivalency of the claims are intended to be included therein.

I claim:

1. A process for producing power with a steam driven prime mover from a two-phase steam and liquid water hydrothermal flow, which comprises:
    (a) separating said two-phase flow into a raw steam flow and a hot water flow at a pressure at least that of the desired inlet pressure of said prime mover;
    (b) delivering said raw steam flow to the inlet of said prime mover;
    (c) passing said hot water flow through heat conversion means for extracting sensible heat from said hot water flow and producing a flow of auxiliary steam at least at said inlet pressure from a portion of said extracted heat and a supply of boiler water;
    (d) delivering said flow of auxiliary steam produced in step (c) to said prime mover inlet; and
    (e) producing mechanical power by expanding in said prime mover said flow of raw steam delivered in step (b) and said flow of auxiliary steam delivered in step (d), and condensing expanded steam discharged from said primer mover.

2. A process according to claim 1, wherein said hydrothermal source is a well in a subterranean water dominated geothermal resource.

3. A process according to claim 1, wherein said prime mover is a turbine.

4. A process according to claim 1, which further comprises:
    (f) supplying said boiler water to step (a) from condensate of steam condensed in step (e).

5. A process according to claim 1, wherein said condensing in step (e) is by indirect contact heat exchange of said expanded steam with a coolant.

6. A process according to claim 1, wherein said condensing in step (e) is by direct contact of from said expanded steam with a flow of relatively cool water.

7. A process according to claim 1, wherein said condensing in step (e) is by transfer of heat from said expanded steam to a circulation of water which is cooled by a heat exchange relation with air.

8. A process according to claim 2, wherein said raw steam flow contains noncondensable gases which were released from solution in the liquid phase upon reduction of pressure in passing from said subterranean resource and in step (a).

9. A process according to claim 8, which further comprises:
    (f) maintaining the pressure of said condensing in step (e) by withdrawing residual noncondensable gases therefrom.

10. A process according to claim 9, which further comprises:
    (g) mixing noncondensable gases withdrawn in step (f) with said water flow from which sensible heat was extraced in step (c), and
    (h) reinjecting underground the water flow from step (g) containing at least a part of said noncondensable gases withdrawn in step (f) dissolved therein.

11. A process according to claim 2, which further comprises:
    (f) reinjecting underground said water flow which has passed through said means in step (c).

12. A process for utilizing thermal energy of a flow comprising hot water which energy is made available for such utilization in the form of steam at a pressure at least approximately the same as the vapor pressure of said hot water, which comprises:
    (a) passing said flow through heat conversion means for extracting thermal energy therefrom and producing, from a portion of said extracted energy and a supply of boiler water, a flow of steam at least approximately at the vapor pressure of said hot water,
    (b) circulating a flow of coolant through said heat conversion means for transferring to said coolant and removing from said means the other portion of said extracted thermal energy, and
    (c) delivering for utilization of said thermal energy the flow of steam produced in said heat conversion means.

13. A process according to claim 12, wherein said hot water is from a well in a subterranean water dominated geothermal resource.

14. A process according to claim 12, wherein said coolant is water.

15. A process according to claim 12, wherein said coolant is air.

16. A process according to claim 12, which further comprises:
    (d) condensing steam delivered in step (c) to form liquid water condensate, and
    (e) supplying said boiler water to step (a) from condensate formed in step (d).

17. A process according to claim 12, wherein said portion of thermal energy from which said flow of steam on step (a) is produced is in the range of 20 to 80 percent of the thermal energy extracted from said hot water flow.

18. Apparatus for producing power from a two-phase steam and hot water hydrothermal flow, which comprises:
- (a) prime mover means comprising means for producing mechanical power by expansion of steam therein and having an inlet thereto for supplying steam at an inlet pressure and an exhaust outlet therefrom for withdrawing steam which has been expanded to a reduced pressure;
- (b) condenser means comprising means for condensing steam to liquid water condensate and having an inlet thereto connected to said exhaust outlet for receiving expanded steam and an outlet therefrom for discharge of said condensate;
- (c) heat conversion means comprising (1) indirect contact heat exhange means having at one end of the heat supply side thereof an inlet and at the other end an outlet for passage of hot fluid to be cooled therein, (2) temperature enhancement means connected in the passage between the outlet from and the inlet to the heat removal side of said heat exchange means for receiving thermal energy and increasing the temperature level of a portion thereof, and (3) boiler means connected in said temperature enhancement means comprising means for transferring thermal energy from said increased temperature level to a supply of water for vaporizing same and producing an outflow of auxiliary steam at least at said inlet pressure;
- (d) separator means comprising means for receiving said two-phase hydrothermal flow and for separating said flow into raw steam and hot water phases, and having separate outlets for said raw steam and hot water; and
- (e) conduits connecting said raw steam outlet of said separator means and said auxiliary steam outflow of said boiler means to said inlet of said prime mover means and connecting said hot water outlet of said separator means to said inlet of the supply side of said heat exchange means.

19. Apparatus according to claim 18, which further comprises:
- (f) means connecting said outlet of said condenser means to said boiler means for supplying condensate for said vaporizing in said boiler means.

20. Apparatus according to claim 19, which further comprises:
- (g) heat exchanger means for transferring thermal energy from the condensing of steam on one side thereof to the vaporization of water on the other side thereof, and having an inlet for receiving the raw steam to be condensed, outlet means for removing the condensation products therefrom, an inlet for receiving boiler water and an outlet for discharging clean steam produced therefrom, and
- (h) conduits connecting the outflow of water from the means (c)(1) and the outlet means of the means (g) to means for reinjecting underground said water and condensation products.

* * * * *